United States Patent [19]
Gretz

[11] Patent Number: 6,112,927
[45] Date of Patent: Sep. 5, 2000

[54] ADJUSTABLE ELECTRICAL FIXTURE MOUNTING BASE

[75] Inventor: Thomas J. Gretz, Clarks Summit, Pa.

[73] Assignee: Arlington Industries, Inc., Scranton, Pa.

[21] Appl. No.: 09/190,779

[22] Filed: Nov. 12, 1998

[51] Int. Cl.[7] .................. H02G 3/12; H02G 3/14
[52] U.S. Cl. ............... 220/3.7; 174/66; 220/3.5; 220/3.94; 220/4.02; 220/241
[58] Field of Search .............. 220/3.2, 3.7, 3.8, 220/3.94, 3.5, 3.3, 241, 242, 4.02; 174/66, 48, 57

[56] References Cited

U.S. PATENT DOCUMENTS

| | | | |
|---|---|---|---|
| 1,843,054 | 1/1932 | Weinstein | 220/3.8 X |
| 2,171,807 | 9/1939 | Rutherford | 220/3.2 |
| 2,959,633 | 11/1960 | Palmer et al. | 174/66 X |
| 3,036,207 | 5/1962 | Endelson | 220/3.2 X |
| 5,158,478 | 10/1992 | Schuplin | 220/3.5 X |
| 5,180,886 | 1/1993 | Dierenbach et al. | 174/66 |
| 5,577,602 | 11/1996 | Conner et al. | 174/66 X |
| 5,594,205 | 1/1997 | Cancellieri et al. | 220/3.2 X |
| 5,623,124 | 4/1997 | Chien | 220/3.8 |
| 5,895,888 | 4/1999 | Arenas et al. | 174/66 |
| 5,965,844 | 10/1999 | Lippa | 220/3.9 X |

Primary Examiner—Allan N. Shoap
Assistant Examiner—Niki M. Eloshway

[57] ABSTRACT

A two-part adjustable mounting base for mounting electrical fixtures to walls or other structural members which comprises a face plate including an access aperture therein and an outlet box behind the face plate, which outlet box remains in at least partial registration with the access aperture as the position of the outlet box relative to the access aperture is changed.

3 Claims, 4 Drawing Sheets

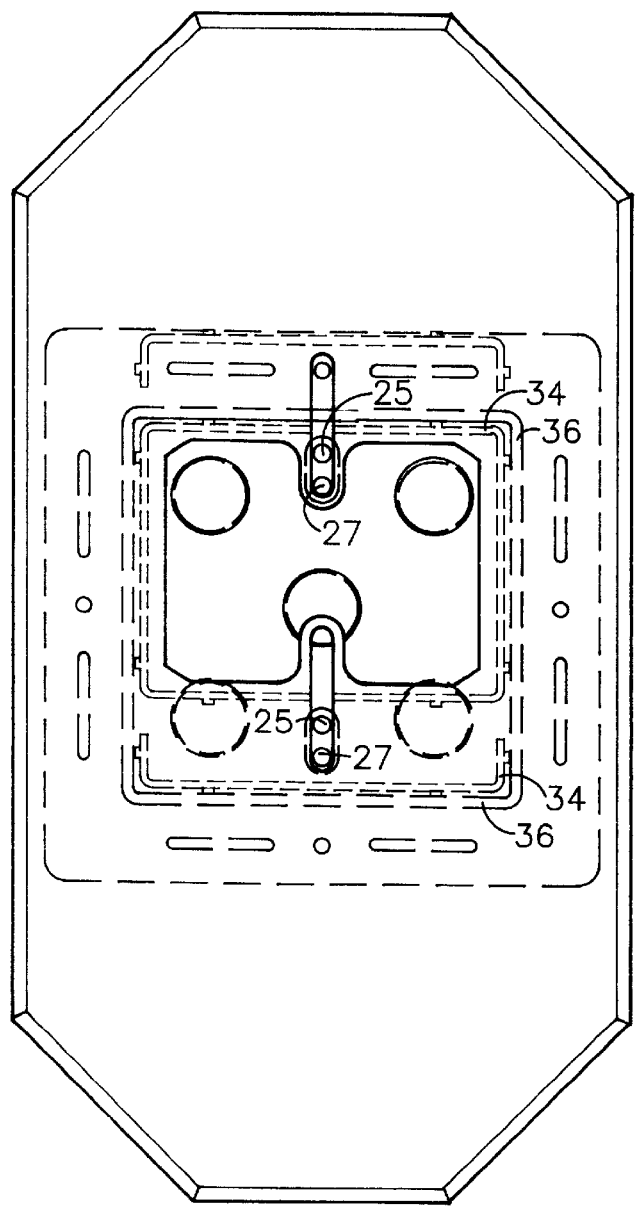
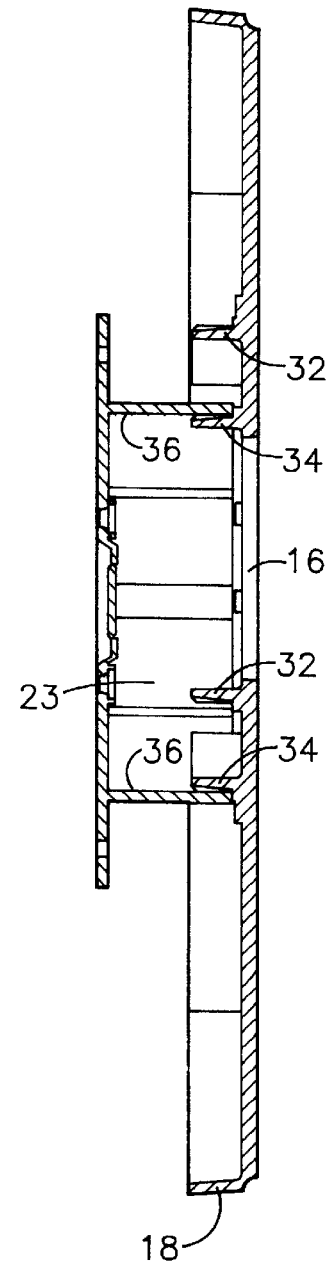
FIG. 3
FIG. 4

ADJUSTABLE ELECTRICAL FIXTURE MOUNTING BASE

FIELD OF THE INVENTION

The present invention relates to mounting bases or plates for mounting electrical light or other electrical fixtures and more specifically to such a device that permits adjustment of the mounting plate for the location of the electrical fixture.

BACKGROUND OF THE INVENTION

In the mounting of electrical fixtures, especially large coachlight types of fixtures, in new or retrofit applications, there is often a problem with obtaining an aesthetically acceptable mounting because of a mismatch between the electrical box installed, or to be installed, and the general configuration of the base of the electrical fixture. This is particularly so in the case where an electrical fixture is being fitted over an existing electrical box and clapboard or some similar siding material with an irregular surface. In such a situation, the normally flat vertical surface of the fixture base does not fit suitably against the irregularities of the siding, leaving gaps which are aesthetically unacceptable. Additionally, the location of the bracket mounting holes in such fixtures may vary by as much as plus or minus one inch, thus making vertical centering of the fixture on any mounting plate intervening between the base of the fixture and the outer surface of the structure even more difficult.

OBJECT OF THE INVENTION

It is therefore an object of the present invention to provide a fixture mounting device for new and retrofit installations which provides an aesthetically pleasing installed final appearance and vertical adjustability to accept a broad variety of fixture bases.

DESCRIPTION OF THE DRAWINGS

The invention will be more fully understood from the following detailed description taken in conjunction with the accompanying drawings, which form a part of this application and wherein:

FIG. 3 is a front view of the adjustable electrical fixture mounting base of FIG. 1 in an alternative configuration;

FIG. 4 is a cross-sectional centerline view of the adjustable electrical fixture mounting base of FIG. 3;

DETAILED DESCRIPTION

Figure 5:
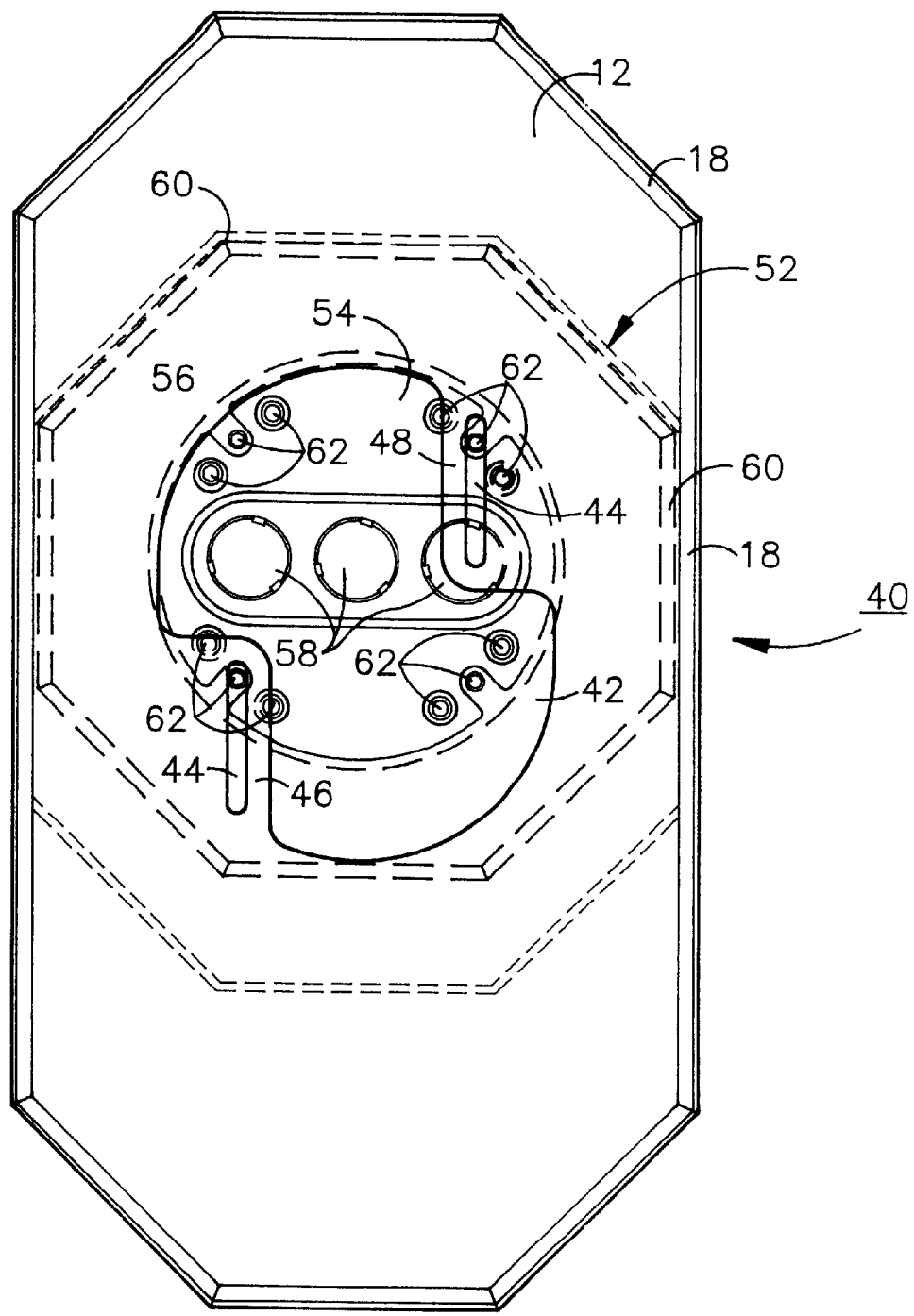
FIG. 5 is a front view of a second embodiment of the adjustable electrical fixture mounting base of the present invention.
Figure 6:
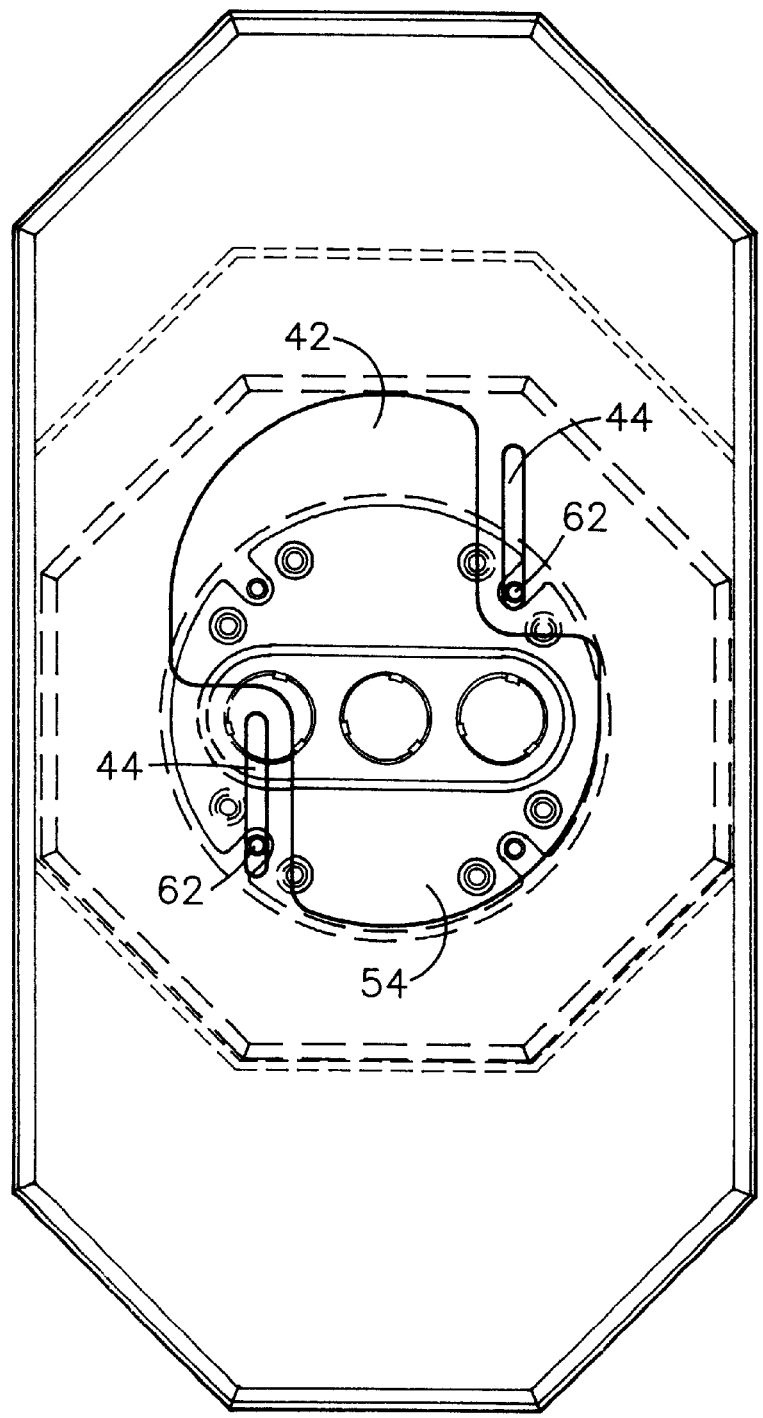
FIG. 6 is a front view of the adjustable electrical fixture mounting base of FIG. 5 in an alternate configuration.

The adjustable electrical fixture mounting base of the present invention is manifested in two embodiments. The first, depicted in FIGS. 1–4, is designed for installation with two vertical positions, while the second, depicted in FIGS. 5 and 6 is designed for variable adjustability.

Figures 1, 2:
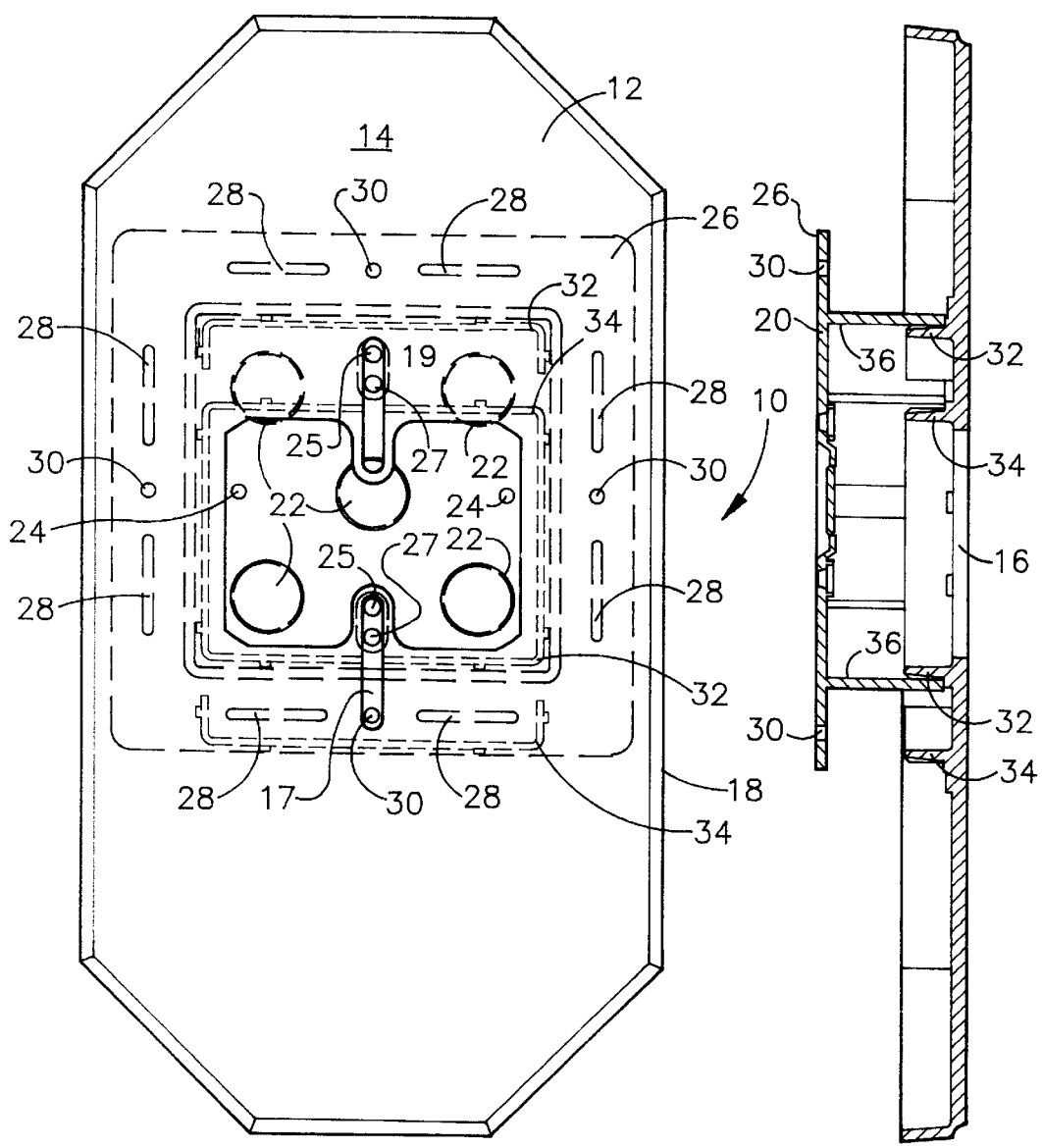
FIG. 1 is a front view of one embodiment of the adjustable electrical fixture mounting base of the present invention.
FIG. 2 is a cross-sectional centerline view of the adjustable electrical fixture mounting base of FIG. 1.

The embodiment of the adjustable electrical fixture mounting device 10 of the present invention shown in FIG. 1 comprises a face plate 12 that is preferably "oversized", i.e. of a size to accommodate the base member of any electrical fixture to be installed thereover. Front surface 14 of face plate 12 has a generally rectangular access aperture 16 therein designed to receive the wiring from any electrical fixture installed thereon. Although the depicted rectangular box is generally preferred, the box and aperture may be of any suitable configuration, so long as engagement, as described hereinafter, is possible. Extending rearward about the entire periphery of face plate 12 is outer flange or side member 18 which serves to stiffen mounting device 10 and to provide stand-off therefor in the installed position. Face plate 12 also includes slots 17 and 19 which are located in base plate extensions which extend at least part way into access aperture 16 whose purpose will be described in detail hereinafter.

Behind face plate 12 is disengageable electrical outlet box 20 (shown in phantom in FIGS. 1 and 3) of a size and configuration to receive incoming wiring to connect with an electrical fixture mounted on face plate 12 through access aperture 16. Disengageable outlet box 20 is of conventional size and square configuration and includes punch-outs 22 of the type generally found in such devices for the passage of wiring, as well as a pair of auxiliary screw holes 24 for receiving the mounting screws (not shown) of an electrical fixture attached to face plate 12. Two pair of primary screw holes 25 and 27 are similarly located in outlet box 20 for a similar purpose, however, in the case of primary screw hole pairs 25 and 27, they underlie, i.e. register with, slots 17 and 19 in face plate 12 such that an electrical fixture may be attached to, i.e. mounted upon, face plate 12 by insertion of appropriate screws through the base of an attached electrical fixture and fastening thereof in one pair of primary screw holes 25 or 27. Outlet box 20 includes a recessed portion 23 for receiving the wires necessary for connection of the fixture to preinstalled wiring. The rearward or back portion of electrical outlet box 20 includes a laterally extending flange 26 about its periphery which in turn includes slots 28 and holes 30 which serve as points of attachment for the outlet box to an underlying wall or other appropriate surface primarily in new construction.

Extending rearward from face plate 12, above and below aperture 16 are matched pairs of outlet box engagement flange pairs 32 and 34. As shown most clearly in FIGS. 2 and 4, the purpose of outlet box engagement flange pairs 32 and 34 is to engage the inner peripheral surface 36 of outlet box 20 at the top and bottom thereof so as to appropriately locate the various screw holes 25 and 27 in position within, i.e. in registration with, slots 17 and 19 such that an electrical fixture mounted upon face plate 12 can be centered or vertically adjusted to the desired height prior to final attachment. Depending upon which engagement flange pairs 32 or 34 engages outlet box 20, the attached fixture will have a different elevation. This is shown graphically by a comparison of FIGS. 1 and 3. In FIG. 1, outlet box 20 engages engagement flange pair 32, while in FIG. 3, outlet box 20 engages engagement flange pair 34. When assembled as shown in FIG. 1, primary attachment holes 25 and 27 sit higher in slots 17 and 19 than they do in the arrangement depicted in FIG. 3 thus allowing for vertical adjustment of the adjustable electrical fixture on electrical fixture mounting base 10.

An alternative embodiment of the adjustable mounting base of the present invention is depicted in FIGS. 5 and 6. The adjustable mounting base 40 of this embodiment is designed for installation with round or octagonal electrical outlet boxes and, although useful for new construction, is primarily aimed to satisfy the needs of the retrofit market.

According to this embodiment, face plate 12, having rearward extending flange 18, has an access aperture 42 and slots 44 therein. The shape of access aperture 42 is generally oblong or oval with slots 44 being located in base plate extensions 46 and 48 which extend into the total oblong shape of access aperture 42 to provide appropriately located and variable access to underlying attachment holes 50 whose location and purpose are described hereinafter.

The second member of adjustable electrical fixture mounting base 40 is electrical outlet box 52 shown in phantom in FIGS. 5 and 6. Outlet box 52 comprises a generally round recess 54 suitable for receiving the wiring for an installed electrical fixture as well as adjustment plate 56. In the embodiment shown, adjustment plate 56 is shown as being octagonal, however, as will be readily understood from the following description, it could also be square or of some other suitable shape so long as it is capable of suitable movable engagement as described hereinafter. Outlet box 52 also includes punch-outs 58 for providing access for wires from an underlying preinstalled conventional outlet box of round or octagonal shape. Adjustment plate 56, preferably, also includes a rearward extending flange 60 about its periphery. Rearward extending flange 60 should be of the same or lesser depth as rearward extending flange 18 for application to flat surfaces, but may also be, and preferably is, contoured or shaped to conform to irregular structure surfaces such as clapboard siding on a home when such a modification is appropriate. The purpose of rearward extending flange 60 is to be able to slideably engage the inner surface of rearward extending flange 18 on face plate 12, on at least two of its opposing sides, to permit relative vertical movement between outlet box 20 and face plate 12, while not allowing any lateral or horizontal movement therebetween.

Outlet box 52 within recess 54 includes at least two and preferably four sets of mounting screw holes 62 which serve to provide the means for attaching the adjustable electrical fixture face plate 12 via outlet box 52 to an underlying, preinstalled electrical outlet box (not shown) in the structure to which the electrical fixture is being attached. At the same time, at least two of mounting screw holes 62 underlie, or register with, slots 44 in face plate 12 such that the fixture can be attached thereto and in turn to the underlying preinstalled electrical box.

As can be seen from a comparison of FIGS. 5 and 6, because of the slideable engagement of rearward extending flanges 18 and 60, electrical outlet box 52 can be vertically adjusted relative to access aperture 42 over the length of slots 44 for purposes of centering or raising and lowering of an installed electrical fixture.

From the foregoing description, one skilled in the art can easily ascertain the essential characteristics of this invention, and without departing from the spirit and scope thereof, make various changes and modifications of the invention to adapt it to various usages and conditions.

I claim:

1. An adjustable electrical fixture mounting base comprising:

an oversize face plate, having a front surface, a rear surface and a periphery;

a rearward extending outer flange about said periphery of said oversize face plate;

an access aperture, generally in the center of said oversize face plate;

an outlet box inside said outer rearward extending flange adapted for engagement with said rear surface;

said outlet box including a recessed portion for receipt of wires in at least partial registration with said access aperture;

screw holes in said outlet box;

base plate extensions on said oversize base plate extending into said aperture;

two linear adjustment slots in said base plate extensions in said oversize face plate arranged to register with said screw holes in said outlet box when said outlet box is located in more than one position on said rear surface relative to said access aperture;

said recessed portion having an inner periphery;

said oversize face place including a first pair of rearward extending engagement flanges adapted to engage said inner periphery of said recessed portion to define a first location of said outlet box relative to said to said access aperture; and said oversize face plate including a second pair of rearward extending engagement flanges adapted to engage said inner periphery of said recessed portion to define a second location of said outlet box relative to said access aperture.

2. The adjustable electrical fixture mounting base of claim 1 wherein said recessed portion and said access aperture are generally rectangular.

3. The adjustable electrical fixture mounting base of claim 1 wherein said outlet box includes at its rearward portion, an integrally formed, laterally extending flange having apertures therein for attachment of said outlet box to a structure.

\* \* \* \* \*